United States Patent [19]

Evans et al.

[11] Patent Number: 5,317,073
[45] Date of Patent: May 31, 1994

[54] FLUOROSILICONE HYDRIDES

[75] Inventors: Edwin R. Evans, Clifton Park; Edward M. Jeram, Burn Hills, both of N.Y.

[73] Assignee: General Electric Company, Waterford, N.Y.

[21] Appl. No.: 676,906

[22] Filed: Mar. 27, 1991

[51] Int. Cl.$^5$ .............................................. C08G 77/24
[52] U.S. Cl. ........................................ 528/42; 528/31; 528/15; 528/27; 556/451; 556/485
[58] Field of Search ............... 556/451, 485; 528/31, 528/42

[56] References Cited

U.S. PATENT DOCUMENTS

| | | |
|---|---|---|
| 3,344,160 | 9/1967 | Holbrook . |
| 4,279,717 | 7/1981 | Eckberg .................. 204/159.13 |
| 4,384,100 | 5/1983 | Takamizawa et al. ............. 556/485 |
| 4,417,024 | 11/1983 | Koda et al. ...................... 528/31 |
| 4,576,999 | 3/1986 | Eckberg ........................... 525/476 |
| 4,585,848 | 4/1986 | Evans et al. ...................... 528/15 |
| 4,599,374 | 7/1986 | Bluestein ........................ 523/213 |
| 4,640,967 | 2/1987 | Eckberg ........................... 528/26 |
| 4,714,275 | 1/1988 | Benditt et al. ................... 528/15 |
| 4,898,903 | 2/1990 | Rasch et al. .................... 524/398 |
| 4,980,443 | 12/1990 | Kendziorski et al. ............ 528/31 |

FOREIGN PATENT DOCUMENTS

| | | |
|---|---|---|
| 279706 | 8/1988 | European Pat. Off. . |
| 435654 | 7/1991 | European Pat. Off. . |
| 1557987 | 12/1979 | United Kingdom . |

*Primary Examiner*—Melvyn I. Marquis

[57] ABSTRACT

Novel fluorosilicone hydrides are provided which are useful as intermediates in the preparation of epoxy-functional fluorosilicones having improved cure efficiency at low temperatures and improved resistance to solvents and fuels than analogous non-fluoro-functional epoxy-functional silicones prepared from non-fluoro-functional silicone hydrides.

11 Claims, No Drawings

FLUOROSILICONE HYDRIDES

CROSS REFERENCE TO RELATED APPLICATIONS

Reference is made to the concurrently filed application identified as Ser. No. 07/676,155, filed Mar. 27, 1991 U.S. Pat. No. 5,178,959.

BACKGROUND OF THE INVENTION

The present invention relates to fluorosilicone hydrides. More particularly, the present invention relates to linear and branched fluorosilicone hydrides useful in the formation of epoxy-functional fluorosilicones which are combinable with onium salt photoinitiators to form improved UV-curable epoxy-functional silicone compositions.

Fluorosilicone hydrides are known in the art. Reference is made, for example, to U.S. Pat. Nos. 4,719,275 (Benditt et al.); 4,898,903 (Rasch et al.); 4,585,848 (Evans et al.); and 4,599,374 (Bluestein).

The preparation of epoxy-functional silicones from silicone hydrides is also known in the art. Reference is made, for example, to U.S. Pat. Nos. 4,279,717 (Eckberg et al.); 4,576,999 (Eckberg); and 4,640,967 (Eckberg).

Ultraviolet radiation-curable compositions containing epoxy-functional silicones and onium salt photoinitiators are also known in the art. Reference is again made to U.S. Pat. Nos. 4,279,717 (Eckberg et al.); 4,576,999 (Eckberg); and 4,640,967 (Eckberg).

The present invention is based on the discovery that the fluorosilicone hydrides of the present invention will form epoxy-functional fluorosilicones having improved cure efficiency at low temperatures and improved resistance to solvents and fuels than analogous non-fluoro-functional epoxy-functional silicones prepared from non-fluoro-functional silicone hydrides.

SUMMARY OF THE INVENTION

The present invention provides hydride-functional fluorosilicones selected from the group consisting of:

(A) linear hydride-functional fluorosilicones having the general formula

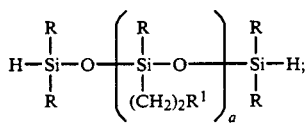

(B) linear hydride-functional fluorosilicones having the general formula

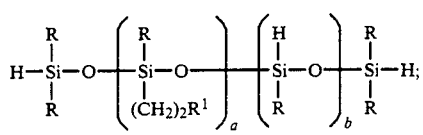

(C) resinous hydride-functional fluorosilicones having the general formula

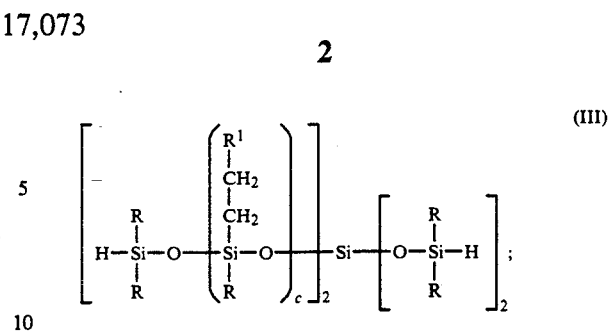

and (D) resinous hydride-functional fluorosilicones having the general formula

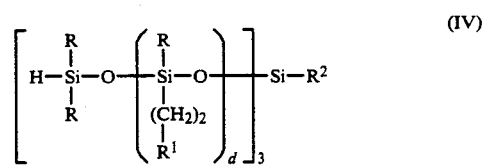

wherein R represents an alkyl radical having from 1 to about 10 carbon atoms or a phenyl radical, $R^1$ represents a perfluoroalkyl radical having from 1 to about 8 carbon atoms, $R^2$ represents an alkyl radical having from 1 to about 10 carbon atoms or a phenyl radical, "a" represents a number from 1 to about 100, "b" represents a number from 1 to about 100, "c" represents a number from 1 to about 100, and "d" represents a number from 1 to about 100.

Epoxy-functional fluorosilicones prepared from the fluorosilicone hydride intermediates above will have improved solvent and fuel resistance and faster cure at lower UV radiation levels.

BACKGROUND OF THE INVENTION

In the fluorosilicone hydrides of formulas (I)–(IV) above, R represents an alkyl radical having from 1 to about 10 carbon atoms or a phenyl radical, $R^1$ represents a perfluoroalkyl radical having from 1 to about 8 carbon atoms, $R^2$ represents an alkyl radical having from 1 to about 10 carbon atoms or a phenyl radical, "a" represents a number from 1 to about 100, "b" represents a number from 1 to about 100, "c" represents a number from 1 to about 100, and "d" represents a number from 1 to about 100.

Preferably, R and $R^2$ each represent an alkyl radical having from 1 to about 4 carbon atoms. Examples of alkyl radicals represented by R and $R^2$ include methyl, ethyl, propyl, and the like. Most preferably, R and $R^2$ are each methyl.

$R^1$ is preferably a perfluoroalkyl radical of from 1 to about 4 carbon atoms, and most preferably a trifluoropropyl radical, i.e., a —$CH_2CH_2CF_3$ radical.

In formulas, "a" is preferably a number ranging from about 3 to about 30 and most preferably from about 10 to about 20. Likewise, "b" is also preferably a number ranging from about 3 to about 30 and most preferably from about 10 to about 20. The letter "c" is preferably a number ranging from about 1 to about 20 and most preferably from about 1 to about 10. The letter "d" is preferably a number ranging from about 1 to about 20 and most preferably from about 1 to about 10.

The fluorosilicone hydride of the formula

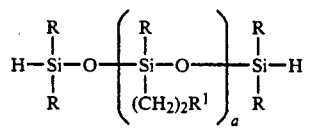

(I)

can be prepared by blending an organic solvent solution of a fluorosilicone disiloxanol telomeric fluid of the general formula HO[(R¹CH₂CH₂)(R)SiO]H, wherein R and R¹ are as previously defined herein, with increment amounts of a dialkylchlorosilane, the temperature of the reaction mixture being kept under 30° C. After addition of the dialkylchlorosilane is complete, the mixture is heated to a temperature of about 80° to about 90° C. for about 2 hours. The reaction mixture is then washed with water to reduce the acidity of the mixture. The resulting mixture is dried, filtered, and vacuum stripped to remove solvent and water.

The fluorosilicone hydride of the formula

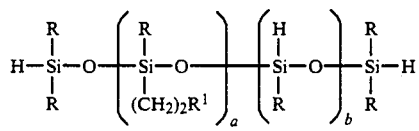

(II)

can be prepared by blending an organic solvent solution of a fluorosilicone disiloxanol telomeric fluid of the general formula HO[(R¹CH₂CH₂)(R)SiO]H, wherein R and R¹ are as previously defined herein, with increment amounts of a dialkylchlorosilane and an alkyldichlorosilane, the temperature of the reaction mixture being kept under 30° C. After addition of the dialkylchlorosilane and alkyldichlorosilane is complete, the mixture is heated to a temperature of about 80° to about 90° C. for about 2 hours. The reaction mixture is then washed with water to reduce the acidity of the mixture. The resulting mixture is dried, filtered, and vacuum stripped to remove solvent and water.

The fluorosilicone hydride of the formula

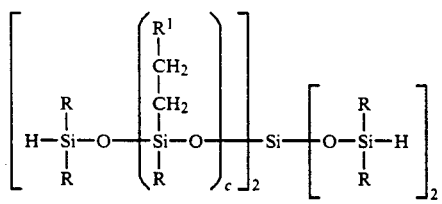

(III)

can be prepared by blending an organic solvent solution of dichlorosilane and a dialkylchlorosilane with tetraalkylorthosilicate. The mixture is then added to water with the temperature kept below 50° C. The mixture separates into two phases— an organic phase and an aqueous phase. The organic phase is washed with water so as to neutralize its acid content. Water and toluene are removed by vacuum stripping and sparging with nitrogen while being heated to a temperature of about 115° to about 150° C. The mixture is then refluxed and the temperature is allowed to reach a temperature of about 175° to about 180° C., resulting in the removal of additional solvent and alcohol. The acid level of the resulting mixture is reduced by treatment of the mixture with Fuller's earth.

The fluorosilicone hydride of the formula

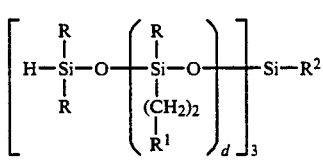

(IV)

can be prepared by blending an organic solvent solution of an alkylhydrogendichlorosilane and perfluoroalkylalkyldichlorosilane with increments of a trialkoxyalkylsilane. After addition of the trialkoxyalkylsilane is complete, the mixture is stirred for about 15 to about 30 minutes and then added to distilled water. The temperature of the mixture is kept at a temperature of about 80° to about 90° C. The mixture is allowed to separate into an organic phase and an aqueous phase at a temperature of about 25° to about 30° C. The organic phase is washed with water until the pH of the mixture is about 6.

The material is then heated to a temperature of about 115° to about 150° C. so as to remove water, solvent, and alcohol. The temperature of the mixture is then increased to 150° to 180° C. for about 1 to 3 hours and additional distillate is recovered. The mixture is treated with Celite 545 and then with Fuller's earth so as to reduce the acidity to less than 5 ppm.

The linear and branched fluorosilicone hydrides of the present invention are useful as intermediates in the formation of epoxy-functional fluorosilicones which are combinable with onium salt photoinitiators to form improved UV-curable epoxy-functional silicone compositions.

The epoxy-functional fluorosilicones are prepared by reacting one of the fluorosilicone hydrides of the present invention with an organic compound containing both ethylenic unsaturation and epoxide functionality in the presence of an effective amount of a precious metal catalyst for facilitating an addition cure hydrosilation reaction.

Organic compounds containing both ethylenic unsaturation and epoxide functionality suitable for preparing the epoxy-functional fluorosilicones are any of a number of aliphatic or cycloaliphatic epoxy compounds having olefinic moieties which will readily undergo addition reaction to SiH functional groups. Commercially obtainable examples of such compounds include 1-methyl-4-isopropenyl cyclohexeneoxide (limoneneoxide; SCM Corp.); 2,6-dimethyl-2,3-epoxy-7-octene (SCM Corp.); and 1,4-dimethyl-4-vinylcyclohexeneoxide (Viking Chemical Co.), and 4-vinylcyclohexeneoxide. 4-Vinylcyclohexeneoxide is preferred.

The precious metal catalyst for the hydrosilation reactions involved in the preparation of the epoxy-functional fluorosilicones may be selected from the group of platinum-metal complexes which includes complexes of ruthenium, rhodium, palladium, osmium, iridium, and platinum.

A fluorosilicone hydride of formula (I) above will form an epoxy-functional fluorosilicone of the formula

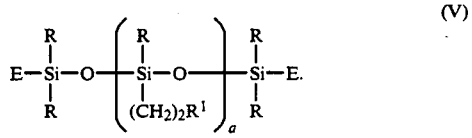

A fluorosilicone hydride of formula (II) above will form an epoxy-functional fluorosilicone of the formula

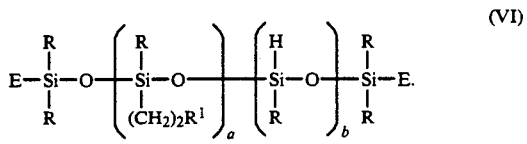

A fluorosilicone hydride of formula (III) above will form an epoxy-functional fluorosilicone of the formula

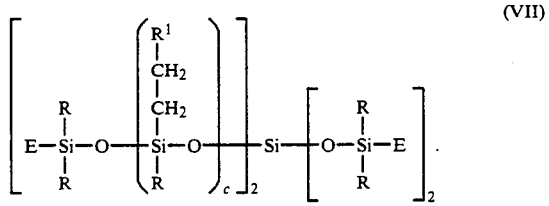

A fluorosilicone hydride of formula (IV) above will form an epoxy-functional fluorosilicone of the formula

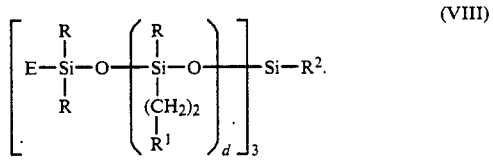

In the epoxy-functional fluorosilicones of formulas (V)–(VIII) above, R, $R^1$, $R^2$, "a", "b", "c" and "d" are as previously defined herein. E represents an epoxy-functional organic group of from about 2 to about 20 carbon atoms.

UV-curable epoxy-functional fluorosilicone compositions are formed by mixing the epoxy-functional fluorosilicones described above with an onium salt photoinitator or combination of onium salt photoinitators.

The preferred onium salts for preparing the UV-curable epoxy-functional fluorosilicone compositions are the diaryliodonium salts such as those disclosed in U.S. Pat. No. 4,882,201, which is incorporated herein by reference. Specific examples of other suitable diaryl iodonium salts include 4-octyloxyphenylphenyl-iodoniumhexafluoroantimonate, bis(dodecyl phenyl)iodonium hexafluoroarsenate and bis(dodecyl phenyl)iodonium hexafluoroantimonate. The most preferred of these iodonium salts is 4-octyloxyphenylphenyl-iodoniumhexafluoroantimonate.

The amount of onium salt catalyst used in the preparation of the UV-curable epoxy-functional fluorosilicone compositions is not critical, so long as proper polymerization is effected. As with any catalyst, it is preferable to use the smallest effective amount possible. Catalyst levels of from about 0.5%–5.0% by weight have been found suitable.

The UV-curable compositions of this invention are cured by exposing the mixture containing the epoxy-functional fluorosilicone and the onium salt photoinitiator or combination of onium salt photoinitiators to an amount of ultraviolet radiation sufficient to cure the composition.

A key advantage of the UV-curable epoxy-functional silicone compositions formed from the fluorosilicone hydrides of this invention is their cure efficiency. These UV-curable epoxy-functional fluorosilicone compositions will cure on exposure to a UV radiation flux of from about 10 to about 200 millijoules/cm$^2$ for a cure time of from about 0.005 to about 0.1 seconds when two focused 300 watt/inch medium pressure mercury vapor UV lamps are used for curing.

In order that those skilled in the art might be better able to practice the present invention, the following examples are given by way of illustration and not by way of limitation.

EXPERIMENTAL

EXAMPLE 1

A fluorosilicone disiloxanol telomeric fluid of the formula HO[(CF$_3$CH$_2$CH$_2$)(CH$_3$)SiO]H with a hydroxy content of 6.2% (447.0 grams) was mixed with 500.0 grams (625 mls) of reagent grade toluene. The mixture was stirred and maintained under a blanket of nitrogen while adding 275 milligrams (239 grams) of dimethylchlorosilane which was 88.7% reactive as determined by gas chromatography. The reaction had to be cooled periodically with an ice-acetone bath to keep the temperature below 30° C. Each addition of the chlorosilane caused the mixture to initially become very hazy but subsequently it became clear within a short period of time. The addition was completed within 30 minutes then the contents of the vessel were heated at 80° C. for 2 hours. The reaction mixture was washed seven times with 500 milliliter portions of water to take the acidity level (HCl) down from 11,520 ppm to 8.6 ppm. The material was dried over silica gel then filtered through Diatomaceous Earth and vacuum stripped on rotary vacuum with water aspiration while heating to 65° C. A clear fluid (507.26 grams, 84% yield) was obtained with a hydrogen content of 0.15% by weight and a very strong Si-H band in the infrared spectroscopy (IR) at 2130 cm$^{-1}$. The average degree of polymerization was 4.3.

The product had the following formula:

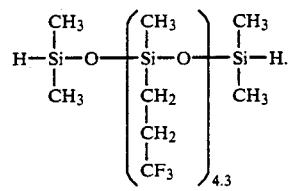

EXAMPLE 2

500.0 grams of a fluorosilicone disiloxanol telomeric fluid of the formula HO[(CF$_3$CH$_2$CH$_2$)(CH$_3$)SiO]H having a hydroxy content of 3.56% were mixed with 500 grams of toluene. In a manner similar to that followed in Example 1, 185 milliliters (161 grams) of dimethylchlorosilane was added to the resulting mixture. The temperature of the mixture was maintained below 30° C. and the addition was complete in 3 hours and 15 minutes. The mixture was refluxed for 2 hours at 85°-87° C. The reactive mixture was washed with water until free of acid and then dried over silica gel, filtered and vacuum stripped to provide 451.64 grams (77.5% yield) of a clear fluid having a viscosity of 144 centipoise at 25° C. and a refractive index of 1.3766 at 25° C. The IR indicates Si-H and the hydrogen content was found to be 0.068 weight % and the specific gravity was 1.25 g/cc. Gas chromatographic analysis indicates that seven components with the major peak corresponding to 58.8%. The average degree of polymerization was 18. The product had the following formula:

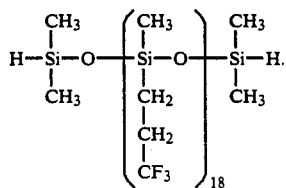

EXAMPLE 3

Fluorosilicone dichlorosilane (480 grams) was mixed with dimethylchlorosilane (376 grams) while in toluene (800 milliliters) under a blanket of nitrogen. With stirring, 222 grams of tetraethylorthosilicate were added to this mixture. With stirring, the reaction mixture was added to 500 milliliters of water with the temperature being kept below 50° C. with an ice-water bath. The layers were separated and the top layer saved. The top layer was washed with water until the acid content was neutral as determined by the litmus test. The water and toluene were removed by vacuum stripping and were sparged with nitrogen while being heated to 150° C. The mixture was refluxed during which the temperature was allowed to reach 178° C., resulting in the removal of an additional 80 milliliters of toluene and alcohol. The resulting material was treated with sufficient amount of Fuller's Earth to reduce the acid level to 10 ppm. 345 grams of fluid having a hydroxy content of 0.588% were recovered. FTIR indicated an Si—H bond at 2140 cm+/−1. The product had the following structure:

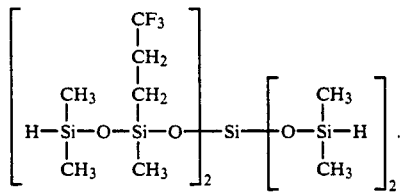

EXAMPLE 4

A resin containing a greater amount of fluorosilicone was prepared in a manner similar to the fluorosilicone prepared in Example 3 except that the amount of methyl-3,3,3-trifluoropropyl dichlorosilane was 844 grams. 828.96 grams of product were recovered and was treated several times with Fuller's Earth to reduce the HCl level from 394 ppm to 15 ppm. The specific gravity of this product was 1.1058 and the hydride content was 0.35%. 759.61 grams of the final product were recovered. The final product had the formula

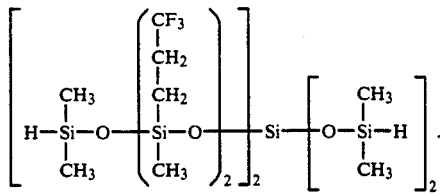

EXAMPLE 5

Methylhydrogendichlorosilane (282.0 grams) and 633 grams of 3,3,3-trifluoropropylmethyldichlorosilane were dissolved in dry toluene (695 mls) while under a nitrogen blanket. To this mixture was added with agitation, 136.2 grams of trimethoxymethylsilane. After the addition was complete, the mixture was stirred for 30 minutes prior to adding it to 497 grams of distilled water. External cooling was applied with a wet-ice bath to keep the temperature at about 40° C. When the reaction temperature subsided to 28° C., the mixture was allowed to separate into phases. The organic phase was then washed with water until the pH was approximately 6. The material was then heated while agitating under a slight nitrogen purge to a temperature of about 148° C. Approximately 680 mls of solvent, water, and alcohol were removed. The vessel temperature was then increased to 180° C. over a period of 4 hours with a Barrett moisture trap recovering an additional 20 ml of distillate. The material was then treated with Celite 545, followed by Fuller's earth to bring the acidity down to less than 5.0 ppm. A clear fluid (524 grams, 71.3% yield) was obtained which had an SiH absorbance in the FTIR at 2130 cm$^{-1}$, and the hydride content was found by gas evolution to be 0.36 weight %. The specific gravity at 25° C. was 1.093 g/cc and the refractive index at 25° C. was 1.3762. The Brookfield viscosity was found to be 28.8 centipoise at 25° C.

EXAMPLE 6

Methyldichlorosilane (378 grams) and 3,3,3-trifluoropropylmethyldichlorosilane (1266 grams) were dissolved in 1200 mls of dry toluene while under a nitrogen blanket. Tetraethylorthosilicate (223 grams) was then added to the mixture with agitation. After 30 minutes, this mixture was added incrementally to 650 grams of water. The reaction vessel was cooled with an ice-water bath to keep the temperature of less than 40° C. When the addition was complete, the mixture was agitated until the temperature reached 28° C. The mixture was allowed to separate into phases and the organic layer washed with water until the pH was approximately 6. The mixture was then heated to 115° C. while agitating under a slight purge of nitrogen to remove toluene, water, and alcohol. The temperature was then increased to 150° C. and held there for 3 hours, recovering an additional 20 mls of distillate in the Barrett moisture trap. The temperature was then increased to 180° C. with the recovery of 15 mls of distillate for a total recovery of 950 mls of solvent, water, alcohol, and other volatiles. The product was filtered through Celite 545 and then Fuller's earth. Treatment with Fuller's earth was repeated until the acidity was less than 5.0 ppm. A clear fluid (724 grams, 57% yield) was recovered which had a hydride content by gaseous evolution of 0.14 weight %. The FTIR showed SiH at 2130 cm$^{-1}$ and the Brookfield viscosity was 64 centipoise at 25° C. The specific gravity was 1.205 g/cc at 26° C. and the RI at 24° C. was 1.3763. The final product had the formula

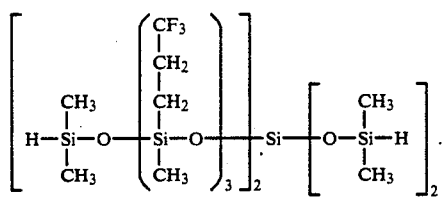

What is claimed is:

1. A hydride-functional fluorosilicone selected from the group consisting of:

(A) a hydride-functional fluorosilicone having the general formula

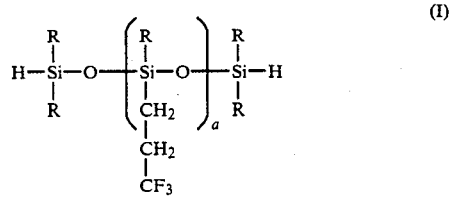 (I)

(B) a hydride functional fluorosilicone having the general formula

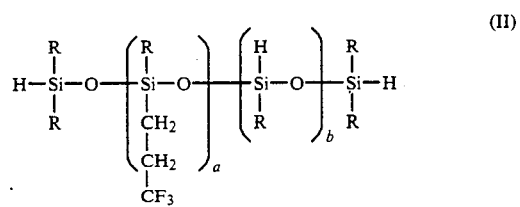 (II)

(C) a hydride-functional fluorosilicone having the general formula

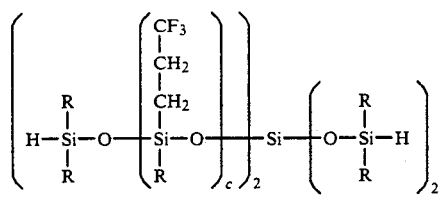 (III)

and (D) a hydride-functional fluorosilicone having the general formula

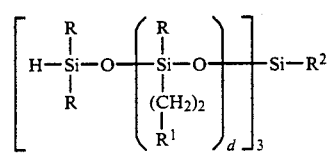 (IV)

wherein R represents a alkyl radical having from 1 to about 10 carbon atoms or a phenyl radical, $R^2$ represents a alkyl radical having from 1 to about 10 carbon atoms or phenyl radical, "a" represents a number from 1 to about 100, "b" represents a number from 10 to about 20 "c" represents a number from 1 to about 100, and "d" represents a number from 1 to about 100.

2. An hydride-functional fluorosilicone according to claim 1 wherein R and $R^2$ each represents an alkyl radical having from 1 to about 4 carbon atoms.

3. An hydride-functional fluorosilicone according to claim 2 wherein R and $R^2$ are each methyl radicals.

4. An hydride-functional fluorosilicone according to claim 1 wherein "a" represents a number from about 3 to about 30.

5. An hydride-functional fluorosilicone according to claim 4 wherein "a" represents a number from about 10 to about 20.

6. An hydride-functional fluorosilicone according to claim 1 wherein "c" represents a number from about 1 to about 20.

7. An hydride-functional fluorosilicone according to claim 6 wherein "c" represents a number from about 1 to about 10.

8. An hydride-functional fluorosilicone according to claim 1 wherein "d" represents a number from about 1 to about 20.

9. An hydride-functional fluorosilicone according to claim 8 wherein "d" represents a number from about 1 to about 10.

10. A hydride-functional fluorosilicone having the general formula

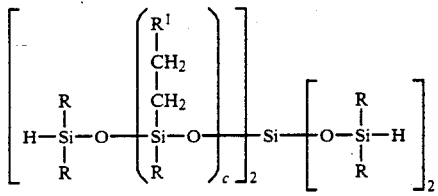

wherein R represents an alkyl radical having from 1 to about 10 carbon atoms or a phenyl radical, $R^1$ represents a perfluoroalkyl radical having from 1 to about 8 carbon atoms, and "c" represents a number from 1 to about 100.

11. A hydride-functional fluorosilicone having the general formula

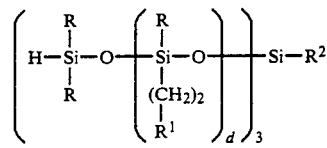

wherein R represents an alkyl radical having from 1 to about 10 carbon atoms or a phenyl radical, $R^1$ represents a perfluoroalkyl radical having from 1 to about 8 carbon atoms, $R^2$ represents an alkyl radical having from 1 to about 10 carbon atoms or a phenyl radical and "d" represents a number from 1 about 100.

* * * * *